United States Patent
Sharp et al.

[11] Patent Number: 6,091,554
[45] Date of Patent: Jul. 18, 2000

[54] MOUNTING OF OPTICAL COMPONENTS

[75] Inventors: Douglas W. Sharp, Cowley; Robert A. Hoult, Beaconsfield, both of United Kingdom

[73] Assignee: PerkinElmer International C.V., United Kingdom

[21] Appl. No.: 09/220,297

[22] Filed: Dec. 23, 1998

[30]  Foreign Application Priority Data

Dec. 29, 1997 [EP] European Pat. Off. .............. 97310649

[51] Int. Cl.[7] ................................................... G02B 7/02
[52] U.S. Cl. ............................ 359/819; 359/813; 359/827
[58] Field of Search ..................................... 359/819–830

[56]      References Cited

U.S. PATENT DOCUMENTS

| 4,316,330 | 2/1982 | Hayes ......................................... 33/488 |
| 4,929,073 | 5/1990 | La Plante et al. ....................... 350/609 |
| 5,214,529 | 5/1993 | Marino et al. ........................... 359/213 |
| 5,249,082 | 9/1993 | Newman ................................... 359/813 |

FOREIGN PATENT DOCUMENTS

| 0362416 | 4/1990 | European Pat. Off. . |
| 0491207 | 6/1992 | European Pat. Off. . |
| 2615000 | 11/1988 | France . |
| 8706358 | 10/1987 | WIPO . |

*Primary Examiner*—Georgia Epps
*Assistant Examiner*—Tim Thompson
*Attorney, Agent, or Firm*—St. Onge Steward Johnston & Reens LLC

[57]           ABSTRACT

A mounting arrangement for accurately orienting an optical component (10) with respect to an axis comprises three mounting elements arranged at the apices of a triangle, one of said mounting elements (16) is fixed whilst the other two (18, 29) are each provided on a pivotable mounting member 20. The mounting member (20) is arranged so that it can pivot against the resilience of a pivot mounting so that when a force is applied to the pivotable mounting member it is caused to pivot and thereby adjust the orientation of the component (10).

7 Claims, 1 Drawing Sheet ized at that particular value the optical component will be maintained in that desired orientation.

MOUNTING OF OPTICAL COMPONENTS

FIELD OF THE INVENTION

This invention relates to the mounting of optical components.

BACKGROUND ART

There is often a requirement in instruments such as spectrometers for an optical component to be mounted in such a way that it is accurately aligned relative to a preselected axis and such that that alignment can be maintained during the operation of the instrument. The present invention is concerned with a mounting arrangement which can achieve this requirement in a relatively simple and effective manner.

According to the present invention there is provided an arrangement for mounting an optical component so that it can be accurately orientated angularly with respect to a defined axis, said arrangement comprising three mounting elements disposed generally at the apices of a triangle, at least two of the two mounting elements each being provided on part of a pivotable mounting member which is supported such that it is pivotable against the resilience of a resilient pivot mounting, and means for applying a force to each of another part of the pivotable mounting member to cause it to pivot about the pivot mounting to thereby adjust the orientation of the optical component.

The arrangement may be such that one mounting element is fixed and the other two are each provided on a pivotable mounting member.

The force applying means may include a solenoid.

The pivot mounting may comprise a torsion bar arrangement which is formed as an integral part of the pivotable mounting member.

Each pivotable mounting member may be generally elongate, the mounting elements being provided towards one end thereof, and the force applying means being arranged to act at the other end thereof. Each pivotable mounting member may have integral, transversely extending links which provides the torsion bar pivot mounting arrangement.

The mounting elements may be arranged at the apices of an equiangular triangle.

SUMMARY OF THE INVENTION

In an arrangement constructed in accordance with the present invention an optical component is mounted so that it is supported on the three mounting elements. It is aligned by applying a force to one or both of the pivotable mounting members so that that mounting member moves against the resilience of its pivot mounting. If the pivoting force is removed then the pivot mounting will return under the action of the resilience of the pivot mounting towards it original position. The means for applying the force to the pivotable mounting member may be incorporated into a feedback loop arrangement so that by monitoring the output derived from the optical component, the alignment of that component can be carried out automatically on the basis of a sensed signal. For example, the arrangement may be such that this sensed signal is maintained at a maximum.

BRIEF DESCRIPTION OF THE DRAWINGS

The invention will be described now by way of example only, with particular reference to the accompanying drawings. In the drawings.

DETAILED DESCRIPTION OF THE PREFERRED EMBODIMENT

Figure 1:
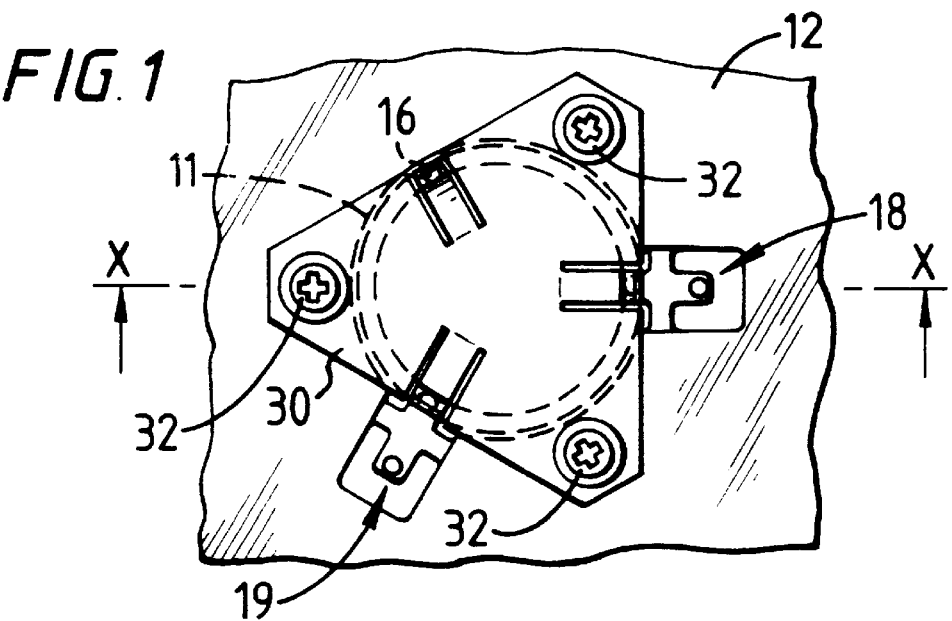
FIG. 1 is a plan schematic view of a mounting arrangement in accordance with an embodiment of the present invention.

The mounting arrangement shown in the drawings is designed to support an optical component (10) within a circular aperture (11) formed in a mounting plate (12). The aperture (11) is formed such that there is defined at a lower peripheral edge of the wall of the plate surrounding said aperture a circumferential radially inwardly extending lip (14). A fixed first mounting pad (16) is carried on the lip (14).

Figure 3:
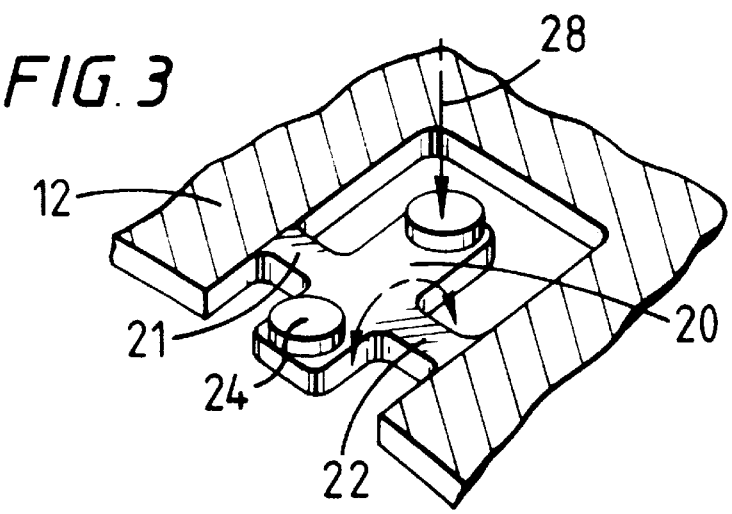
FIG. 3 shows in more detail a part of the mounting arrangement of FIG. 1.

At positions spaced by 120° from the fixed pad (16) two mounting assemblies (18 and 19) are provided. With particular reference to FIG. 3 each mounting assembly (18) has been formed by machining the mounting plate (12) at the appropriate position to define an elongate mounting member (20) which is connected integrally to the main body of the mounting plate by laterally extending portions (21, 22) in such a manner as to define a torsion bar arrangement. An optical component mounting pad (24) is provided at the radially inner portion of the elongate member (20), whilst the other end can receive a force applied by a solenoid rod (26) coupled to a solenoid (not shown). As can be seen from FIG. 3 a force applied downwardly in the direction of the arrow (28) will cause the elongate member (20) to pivot slightly around the laterally extending portions (21 and 22), thereby raising the pad (24). Similarly if that force is reduced then the pad (24) will return to its lower position by virtue of the natural resilience of the arrangement. The degree of movement of the pad (24) which can be provided by the arrangement shown in FIG. 3 is of the order of a few microns.

It will be appreciated that the mounting assembly shown at FIG. 3 is provided at each of the positions (18 and 19) shown in FIG. 1.

Figure 2:
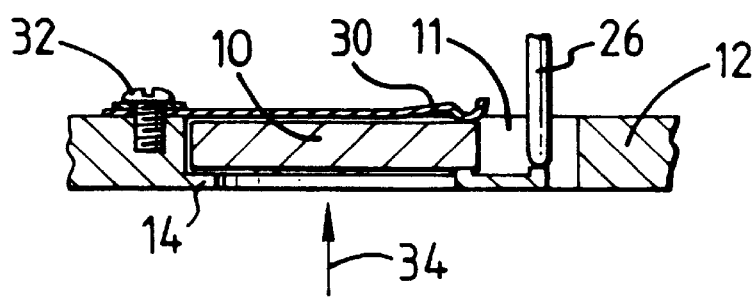
FIG. 2 is a section on the line X—X of FIG. 1.

Referring to FIG. 2 the optical component is thus mounted at three equiangularly spaced position on the pad (16) and the two pads (24). A leaf spring (30) which is secured by screws (32) to the mounting plate (11) maintains the component in position on the pads within the aperture (11).

In operation the fixed pad (16) acts as a pivot point for the optical component (10), whilst the other two pads (24) can be adjusted to cause the optical component to pivot about that pivot point. When adjustment of the optical component is required, either or both of the linear solenoids is energised to apply a force to the radially outer end of the elongate mounting member (20). This causes the opposite end of the elongate mounting member which carries the pad (24) to deflect slightly thereby pivoting the optical component about the pad (16). By incrementing the current into the solenoid the force applied by the solenoid can be incremented, thus providing an incremental pad displacement. This in turn causes the optical component to rotate about the pivot pad, thus changing the orientation of the optical component. By monitoring the output signal of the optical component, it is possible to control the two solenoids in such a way that the optical component is maintained in the optimum position, e.g. when its optical output is at a maximum.

It will be appreciated that provided the elastic limit of the torsion bar assembly is not exceeded once the solenoid force is reduced or removed, the arrangement will return to its original position. Thus, by controlling the current in both solenoids the deflections of the pads (24) can be used to cause the optical component (10) to take up any desired orientation within the limit of movement of the pads.

As shown in FIG. 2, the optical component can be a mirror in which a light beam (34) is shown to be incident on the mirror. By monitoring the output signal reflected form that mirror and using an appropriate feedback arrangement automatic adjustment can be made to the current applied to the solenoids to keep the light energy at a maximum. Thus the arrangement can be used to provide automatic alignment.

What is claimed is:

1. An arrangement for mounting an optical component so that it can be accurately oriented angularly with respect to a defined axis, said arrangement comprising three mounting elements disposed generally at the apices of a triangle, one of the mounting elements being fixed and the other two being each provided on a respective pivotable mounting member which is supported such that it is pivotable against the resilience of a resilient pivot mounting, and means for applying a force to each of another part of the pivotable mounting member to cause it to pivot about the pivot mounting to thereby adjust the orientation of the optical component.

2. An arrangement for mounting an optical component so that it can be accurately oriented angularly with respect to a defined axis, said arrangement comprising three mounting elements disposed generally at the apices of a triangle, at least two of the mounting elements each being provided on part of a pivotable mounting member which is supported such that it is pivotable against the resilience of a resilient pivot mounting, and a solenoid for applying a force to each of another part of the pivotable mounting member to cause it to pivot about the pivot mounting to thereby adjust the orientation of the optical component.

3. An arrangement for mounting an optical component so that it can be accurately oriented angularly with respect to a defined axis, said arrangement comprising three mounting elements disposed generally at the apices of a triangle, at least two of the mounting elements each being provided on part of a pivotable mounting member which is supported such that it is pivotable against the resilience of a resilient pivot mounting, and means for applying a force to each of another part of the pivotable mounting member to cause it to pivot about a torsion bar arrangement which is formed as integral part of the pivotable mounting member to thereby adjust the orientation of the optical component.

4. A mounting arrangement according to claim 3, wherein each pivotable mounting member is generally elongate, the mounting elements being provided towards one end thereof and the force applying means being arranged to act at the other end thereof.

5. A mounting arrangement according to claim 4 wherein each pivotable mounting member has integral, transversely extending links which provides the torsion bar pivot mounting arrangement.

6. A mounting arrangement according to claim 1, wherein the mounting elements are arranged at the apices of an equiangular triangle.

7. A mounting arrangement according to claim 2, wherein the solenoid is arranged to be controlled in accordance with a sensed output of the optical component, whereby the orientation of the component can be adjusted automatically.

* * * * *